UNITED STATES PATENT OFFICE.

CARLETON ELLIS, OF MONTCLAIR, NEW JERSEY.

ESTERIFIED EDIBLE PRODUCT.

1,372,616.     Specification of Letters Patent.     Patented Mar. 22, 1921.

No Drawing.     Application filed June 29, 1917. Serial No. 177,647.

*To all whom it may concern:*

Be it known that I, CARLETON ELLIS, a citizen of the United States, and a resident of Montclair, in the county of Essex and State of New Jersey, have invented certain new and useful Improvements in Esterified Edible Products, of which the following is a specification.

This invention relates to the preparation of ethyl stearate and similar fatty esters and relates in particular to the production and utilization of a species of such esters intended for or specifically adapted for use as or in a food product or products.

Ordinary stearic acid of commerce, at least the better grade, melting at 60° C. or higher (pure stearic acid melts at about 69°) and while practically tasteless is not of itself of a desirable character for edible purposes. If, however, the stearic acid is combined with ethyl alcohol to produce ethyl stearate, a soft fat or even an oil may be obtained which may be treated to yield a product of an edible character useful in various food products.

Ethyl stearate may be prepared by heating stearic acid preferably with an excess of ethyl alcohol in the presence of approximately 1% of sulfuric acid or similar agent, the heating being carried on for a period of several hours, employing a reflux condenser or pressure vessel until a substantial proportion of the stearic acid has been esterified.

The excess of ethyl alcohol may then be removed and the fatty product carefully cooled to cause the unchanged stearic acid which is usually present to crystallize, when the product may be pressed and the liquid obtained will be found to consist largely of ethyl stearate. If under these conditions there is still left some stearic acid in undesirable proportion, this free acid may be removed by washing with an alkali, as for example, caustic soda solution to yield the stearic ester, producing a practically neutral fatty compound.

The melting point of ethyl stearate from commercial stock was found in one case to be approximately 26° C. and this material has a tendency to crystallize to some extent forming flaky crystals, which might be objectionable in certain food products but which is not objectionable in other products of an edible character.

For example, the ethyl stearate may be mixed with flour, water, seasoning material and baking powder, or other aerating reagent, yeast, etc., to produce a dough which when baked will be found satisfactorily shortened by the ethyl stearate. Most liquid fats contain large proportions of unsaturated material such for example as olein or linolein, and in baking, the exposure to the heated air of the oven causes more or less change or even rancidification or brings out the odor and taste of a poor grade of fat in which incipient rancidification existed. In the present product a liquid fat is available which is free from these objections and which contains a saturated product not readily capable of any further undesirable change. Even if hydrolysis were to take place, the products would be a mixture of stearic acid with ethyl alcohol and when such hydrolysis may have taken place to a slight extent because of the severe rancidity-producing conditions, the ethyl alcohol liberated would tend to check such action. Thus ethyl stearate may be looked upon to some extent at least as a substance capable of checking its own rancidification and also be of some value at least in checking the rancidification of other oils and fats.

A proportion of ethyl stearate may be admixed with various animal and vegetable oils, such as oleo, lard and tallow oils, marine animal oils, cottonseed, corn, cocoanut, peanut, soy bean, sesame, linseed and other oils and also solid fats, such as stearin, lard, tallow, butter and the like, the proportion ranging from say 10% or so of ethyl stearate on the one hand to a percentage of say 90% or so of this liquid or semiliquid fat, depending on the requirements as to consistency, stability, and the like.

When first prepared, ethyl stearate has a flavor and odor which is not entirely satisfactory to some palates and may be improved by passing steam therethrough, which affords a sweetening of the ester, making it almost tasteless and with little or no odor, the residual odor of some products being of an agreeable character.

Ethyl stearate emulsified with milk with admixture of salt and a coloring matter produces a form of butter. It may be admixed with butter, oleo oil, cottonseed oil and some suitable stiffening fat, cotton, corn oil, lard and the like to produce a butter-like product and a species of oleomargarin may be made with 10 to 40% of ethyl stearate by emulsifying with milk to obtain a suitable fat-like emulsion.

The excess of stearic acid not entering into the reaction as noted above may be re-esterified with additional quantities of alcohol. Consequently when prepared in accordance with the above illustration, it is not necessary to remove the ethyl stearate completely from the press cake.

Owing to a tendency of some forms of ethyl stearate to crystallize, it may be admixed with a fat which does not have any pronounced tendency to form crystals or flakes and to that end certain oils or tallows of an amorphous quality may be incorporated with the ethyl stearate, in say, equal parts or thereabout.

A product made by mixture of fats and ethyl stearate may be melted and passed over a chill roll, producing a fat of desirable consistency and texture and of fairly permanent qualities having if desired approximately the melting point of lard and which may be used as a substitute for lard.

The use of ethyl stearate enables the introduction into food products of an ester of a saturated fatty oil yielding a stable liquid oil or semiliquid product which permits the adjustment of fatty mixtures with reference to melting point and consistency to the desired degree without introducing a quantity of unsaturated oil which would tend to rancidify and spoil. Ethyl stearate apparently is comparatively resistant in the presence of moisture so that emulsified fatty mixtures made with ethyl stearate and water, milk and the like afford a more permanent admixture as regards keeping qualities than is readily obtained with many of the unsaturated fats.

In a similar manner the ester of palmitic and the mixed ester of palmitic and stearic acids may be produced and used as food products. Other of the higher saturated fatty acids may afford products capable of use in the same way.

Esters may be produced by boiling stearin with ethyl alcohol and a small amount of sulfuric or hydrochloric acid, glycerin being liberated.

It is generally considered that stearic acid or stearin is not a readily digestible fat because its melting point is so much higher than the temperature of the body and that to be readily digestible, the fat should melt readily at the body temperature. Consequently stearin and stearic acid have been condemned by some as having no nutritive value. By the present process it becomes possible to convert the stearic acid into an ester which melts at or below the temperature of the body and therefore is preferable to some high melting point fats. By using mixtures of stearic and palmitic esters a product of somewhat lower melting point, even more desirable in some cases, is obtained. Of course, palmitic acid has a high melting point similar to stearic acid and has been used in edible fats as ordinary palmitin or palmitic glycerid. A mixture of ethyl palmitate and stearate, in say, approximately equal parts, yields a very fluid oil which has considerable mobility and may be used to reduce the viscosity of other oils for the purpose of making salad oils, fish oils and the like. Ordinary commercial stearic acid so-called, is usually a mixture of stearic and palmitic acids and sometimes contains oxyacids or other inedible products such as di-hydroxystearic acid and esters made from the commercial or crude material in some cases have toxic products and undesirable or objectionable constituents and I preferably use a pure stearic acid or a mixture of stearic and palmitic acid free from these objectionable bodies and particularly one free from any traces of toxic materials of the character above described or of any other matter which would be poisonous to the human system. It is my opinion that owing to the limpidity of the ethyl stearate, or stearate and palmitic mixture, or similar ester of higher saturated fatty acids, that such a body is particularly adapted as a foodstuff, being very readily assimilated because of its peculiar characteristics.

In preparing the ethyl ester it is important to free the material from any objectionable traces of sulfuric derivatives, chlorin compounds, aldehydes, toxic polymers, low boiling acids or esters, or any other similar bodies which might be present or form from too protracted boiling of the material during esterification or during any other processing to which the ester may be subjected.

Besides producing an ester which is free from toxic bodies it is necessary to eliminate all the noxious odors or flavoring materials having an objectionable quality. Treating with steam as indicated or subjecting to steam in vacuum may be used. Passing a current of an ordinary inert gas through the ester in many cases suffices. For example, I have obtained a species of ethyl palmitate having the odor of Bartlett pears tainted with a certain musty odor or taste which is objectionable, and on steam distillation practically all of the musty odor is removed, leaving only a kind of pear-like odor which is faint and not objectionable and which in fact is somewhat pleasing.

A salad oil prepared from ethyl stearate 10 parts by weight and olive oil 2½ parts by weight is a very pale limpid oil of agreeable qualities and pronounced fluidity at ordinary room temperature.

An oil for preserving fish, such as sardines, may be made by warming and mixing ethyl stearate and other fatty oil, e. g., cottonseed in various proportions, as for example, equal parts, giving a very fluid oil which has excellent penetrating qualities and may be expected to have a very desirable preservative effect, due no doubt to the peculiar character of the ethyl stearate or similar ester employed.

With reference to this preservative quality it may be further noted that in the case of ordinary glycerids, if rancidity occurs, usually hydrolysis takes place, resulting in the liberation of glycerin which becomes moldy and decomposed affording a nutrient medium for bacteria, while in the case of ethyl stearate any hydrolysis occurring liberates ethyl alcohol which promptly checks further bacterial growth or fermentation.

The use of ethyl stearate in foodstuffs as ordinary bread or biscuit and other material is desirable and for this purpose the mixed ester of ordinary stearic acid is desirable and other fats may be used therewith to any extent desired. Thus the stearic ester is mixed with flour or meal, baking powder and other constituents employed and a baked product produced therefrom. In some cases the stearic ester, that is to say, ethyl stearate and the like is mixed with a portion only of the flour used so that the latter acts as a carrier for the shortening material. In this way self-raising flour may be produced by incorporating the ester with flour, baking powder, etc., to yield a product containing all the constituents needed in making foodstuffs of this character requiring merely the addition of water to form a dough of the desired properties. The use of ethyl stearate or similar ester or the saturated fatty acid is particularly desirable. Ordinary glycerids, containing unsaturated components when used with a material like flour, become rancid and this fact had led to considerable criticism on the use of such glycerids in self-raising flours, whereas in the case of the ethyl stearate or palmitate, a liquid or product containing a liquid ester of a saturated fatty acid is used in an advantageous manner.

It is possible to prepare esters of glycerin by heating stearic acid and glycerin forming a hard product which may be mixed with the ethyl stearate to modify the consistency of the latter yielding as desired, consistent fats such as lard or tallow products.

In one case a mixture of ethyl stearate 10 parts by weight, cotton oil 10 parts and synthetic glycerid or stearic acid 5 parts was prepared giving a stiff consistent fat of an edible character. In preparing a synthetic glycerid, an excess of glycerin may be used, giving a monostearin or distearin instead of the tristearin and such products may be satisfactorily incorporated with or preserved by the ethyl stearate or palmitate.

In another case a mixture of equal parts by weight of ethyl stearate and ordinary lard was of very soft consistency at room temperature and was a white liquid at summer heat.

In another case 10 parts of ethyl stearate by weight, 10 parts of beef fat and 6 parts of cotton oil was of a substantially lard-like consistency at ordinary room temperature and at summer heat was considerably softer.

It has long been a desideratum in the oil trade to secure a practically water-white liquid fat and such a product may be obtained by the esterification of stearic or palmitic acid with ethyl alcohol. The ethyl stearate or palmitate obtained my be used as indicated with other oils to improve their color, change their viscosity, improve their keeping qualities and modify their odor and flavor and to render higher melting point fats softer in character or to dissolve them in some solutions and in various other ways these esters or saturated fats may be employed in the fat industry to yield both edible products and technical products of a useful character.

Various inedible forms of esterified material may be produced, as for example, from crude oleic acid or red oil if prepared by esterification with methyl, ethyl, or other alcohol of the fatty or aromatic series and such product may be obtained which will be practically neutral and of quite a stable character. This material may be used as a lubricant or for water-proofing purposes, in leather greases and various other industrial operations. Prepared from higher grade material the product may be used for medical or pharmaceutical purposes, such as substitute for lanolin, as to replace Russian petroleum oil and the like in various ways, as for example, as a vehicle for thymol for throat sprays. It may be used as a basis for sweet oil and camphorated oil and as an emollient. Both the stearates, palmitates and oleates of methyl or ethyl and other alcohols may be used in various ways in this field, but for internal use the ethyl stearate, palmitate or oleate is preferable. Ethyl stearate yields practically a water-white product which is of a lighter color than a product of any oil now produced by bleaching and because of this light color it may be used advantageously for many purposes where the color is objectionable in ordinary glycerids.

As a basis of a salad oil ethyl stearate may be used alone or combined with 10% or more of olive oil or other fatty oil. A steam-treated ethyl stearate practically free from taste or odor may be incorporated with only a small amount of good quality olive oil to produce a product which may be used as a salad oil and in the preparation of various dressings for salad and the like. A mixed ethyl stearate and palmitate may be used as an oil for preserving fish.

A lard compound is made from ethyl stearate-palmitate 10 parts, synthetic stearin 10 parts, beef fat 9 parts and cottonseed oil 20 parts.

What I claim is:—

1. As a fatty food product, ethyl stearate of an edible nature and other fatty material admixed therewith, said product being adapted for use as a shortening agent.

2. As a food product an edible ethyl ester of a higher fatty acid incorporated with other fatty material, and adapted for use as a shortening agent.

3. As a food product an edible ethyl ester of a normally substantially solid fatty acid incorporated with other fatty material, and adapted for use as a shortening agent.

4. As a food product an edible ester of a lower alcohol and a higher fatty acid incorporated with other edible material, and adapted for use as a shortening agent.

5. A food product comprising an ethyl ester of a normally substantially solid fatty acid, in admixture with other edible material.

6. An ester of a normally substantially solid fatty acid with a monovalent-alkyl group, in admixture with other edible material, such product being edible.

7. As a fatty compound palatable ethyl stearate admixed with other fats having approximately the consistency of lard, such product being substantially free from inedible materials.

8. As a fatty compound a palatable ester of a higher fatty acid admixed with other fats having approximately the consistency of lard.

CARLETON ELLIS.